United States Patent [19]
Koai

[11] Patent Number: 5,103,333
[45] Date of Patent: * Apr. 7, 1992

[54] PHOTONIC TIME-SLOT INTERCHANGERS USING CASCADE-STRUCTURED INTEGRATED OPTICAL SWITCHES

[75] Inventor: Kwang T. Koai, Acton, Mass.

[73] Assignee: GTE Laboratories Incorporated, Waltham, Mass.

[*] Notice: The portion of the term of this patent subsequent to Mar. 26, 2008 has been disclaimed.

[21] Appl. No.: 422,251

[22] Filed: Oct. 16, 1989

[51] Int. Cl.$^5$ ............................................. H04J 14/08
[52] U.S. Cl. ................................... 359/140; 359/138
[58] Field of Search ............... 370/1, 4; 455/600, 612, 455/617; 359/138, 139, 140

[56] References Cited

PUBLICATIONS

Lars Thylen, "Integrated Optics in LiNbO$_3$ Recent Developments in Devices for Telecommunications", *Journal of Lightwave Technology*, Jun., 1988; pp. 847-861.
Rod C. Alferness, "Waveguide Electrooptic Modulators", *IEEE Transactions on Microwave Theory and Techniques*, Aug., 1982; pp. 1121-1137.
Tadashi Saitoh and Takaai, Mukai, "Recent Progress in Semiconductor Laser Amplifiers", *Journal of Lightwave Technology*, Nov. 1988; pp. 1656-1664.
R. A. Thompson & P. P. Giordano, "An Experimental Photonic Time-Slot Interchanger Using Optical Fiber as Reentrant Delay Line Memories", *J. Lightwave Tech.*, Jan. 1987.
R. A. Thompson, "Architecture with Improved Signal-to-Noise Ratios in Photonic Systems with Fiber Loop Delay Lines", *IEEE J. Selected Areas in Comm.*, Aug. 1988.

*Primary Examiner*—Edward L. Coles, Sr.
*Assistant Examiner*—L. Pascal
*Attorney, Agent, or Firm*—Lawrence E. Monks; James J. Cannon, Jr.

[57] ABSTRACT

A photonic time-slot interchanger with fiber-loop delay-line memories is provided with multistage, cascade-structured integrated optical switches in the write-in, store and circulate and read-out functions to provide improved signal-to-crosstalk ratios and control tolerances, and to increase significantly the number of time slots supported by the improved interchanger.

4 Claims, 7 Drawing Sheets

PHOTONIC TIME-SLOT INTERCHANGERS USING CASCADE-STRUCTURED INTEGRATED OPTICAL SWITCHES

BACKGROUND OF THE INVENTION

This invention pertains generally to the field of fiber optic communication systems and more particularly to the use of integrated optical components and optical subsystems in such systems. Specifically, the invention relates to photonic delay-line time-slot interchangers employing cascade-structured integrated optical switches.

Figure 1:
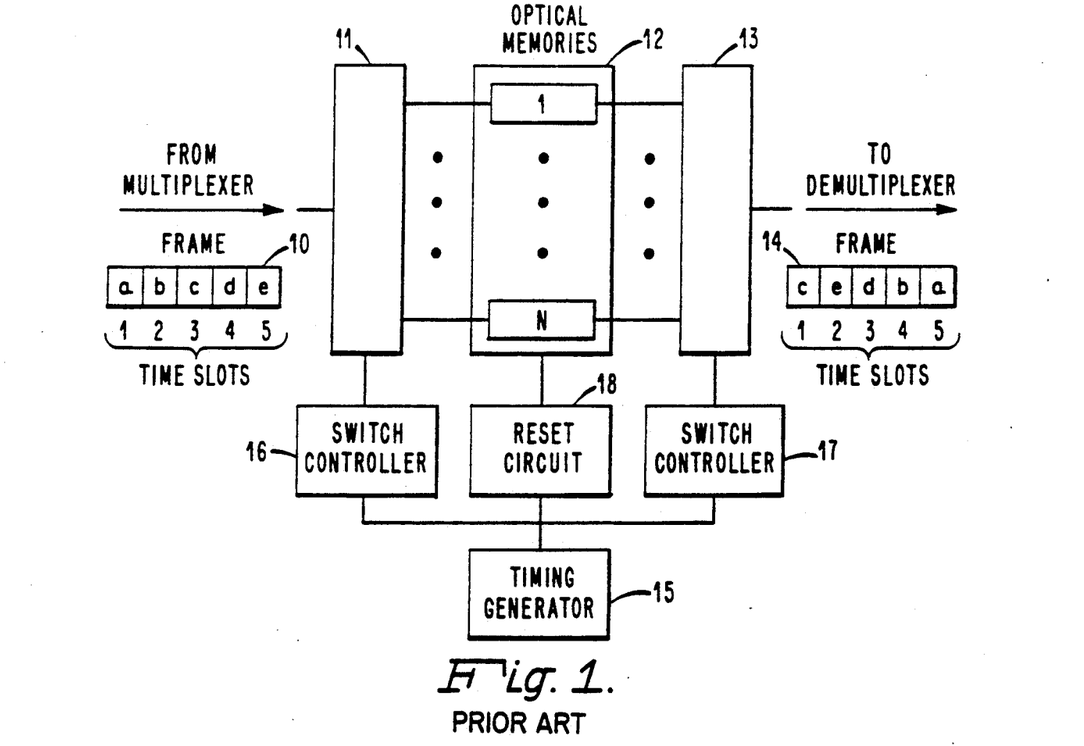
FIG. 1 is a generalized block diagram of a photonic time-slot interchanger.

Several recent articles cited above have discussed the design and performance of photonic time-slot interchangers with fiber-loop delay lines. FIG. 1 illustrates the general structure and functionality of a photonic time-slot interchanger. These articles have reported that the number of time slots which can be interchanged is limited by the internal signal-to-noise ratio (ISNR) or the signal-to-crosstalk ratio (SXR) of the time-slot interchanger systems.

One of the key components of such systems is the optical switch. The ISNR or the SXR of a photonic time-slot interchanger has a strong dependence on the loss and extinction ratio of the optical switches in the fiber loops. Using the ideal optical switch, with zero loss and zero crosstalk, the SXR approaches infinity. For the near term, the most promising optical switch for such applications is the integrated-optic electrooptic switch, such as the directional coupler switch (including uniform delta-beta, reverse delta-beta or other electrode designs), or the cross-shaped digital switch. Thompson and Giordano have implemented a time-slot interchanger system using reverse delta-beta directional coupler switches for handling three time slots. (R. A. Thompson and P. P. Giordano, "An experimental photonic time-slot interchanger using optical fibers as reentrant delay-line memories", J. Lightwave Tech. Jan. 1987).

R. A. Thompson ("Architectures with improved signal-to-noise ratio in photonic systems with fiber loop delay lines", IEEE J. Selected Areas in Commun., August 1988) proposed several designs and showed analytically that the SXR could be improved by using architectural designs.

Figure 2:
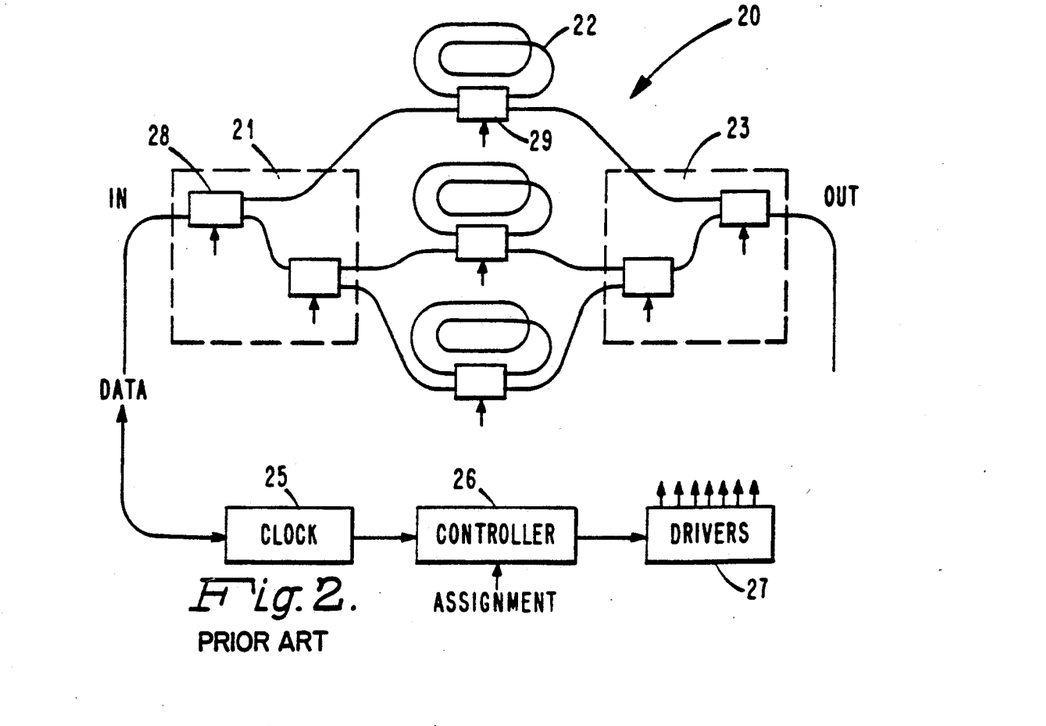
FIG. 2 is a block diagram of a prior art photonic time-slot interchanger using re-entrant fiber loops.

FIG. 2 shows a first embodiment of a photonic time-slot interchanger 20 using N reentrant fiber-loop memories 22, as described by Thompson. The 1×N optical switch 21 and the N×1 optical switch 23 are series of N interconnected 1×2 optical switches 28. Each fiber-loop memory includes a 2×2 optical switch 29 which are implemented by lithium niobate directional couplers. A clock 25 controller 26 and drivers 27 complete the system.

A second embodiment of the photonic time-slot interchanger of FIG. 2 (not shown) is substantially similar to that of FIG. 2, except that it uses N+1 reentrant fiber-loop memories 22 for an N-slot system, the extra-loop design, as described by Thompson. The second embodiment also has a 1×(N+1) optical switch 21 and an (N+1)×1 optical switch 23.

Figure 3:
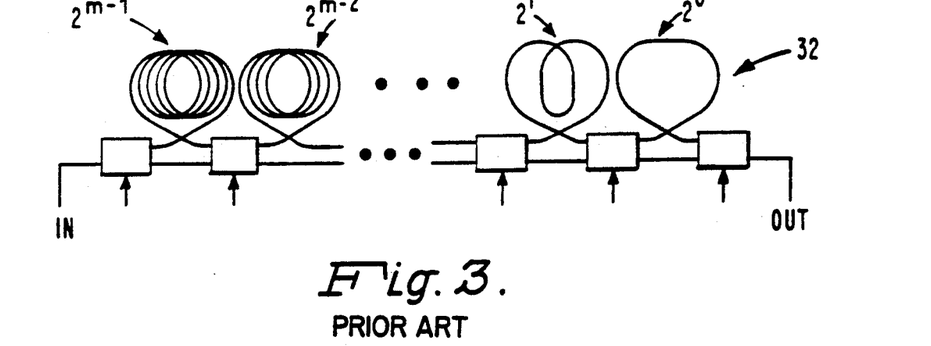
FIG. 3 is a diagram of a prior art alternate memory structure for a photonic time-slot interchanger using the minimal-transversal design which replaces the fiber loops in FIG. 2.

A third embodiment of the photonic time-slot interchanger of FIG. 2 (not shown) is substantially similar to that of FIG. 2, except that it replaces the reentrant fiber-loop memories 22 with the general series feedforward structure of FIG. 3 to provide the minimal-transversal design, as described by Thompson.

In his three designs, i.e., the re-entrant loop, the extra loop, and the minimal-transversal designs, which are shown in FIGS. 2 and 3 respectively, Thompson uses conventional directional coupler switches. Generally speaking, these switches have quite limited extinction ratios. In controlling the photonic time-slot interchanger, automatic electronic circuits must be used. However, since individual voltage adjustments are generally needed for directional coupler switches due to the nonuniformity of the fabricated devices and the drifting of the operating point, automatic control has been difficult and unreliable.

SUMMARY OF THE INVENTION

A principal object of this invention is to provide a significantly improved photonic time-slot interchanger through the use of cascade-structured integrated optical switches.

Another object of the invention is to provide such a time-slot interchanger with improved SXR.

A further object of the invention is to provide an improved photonic time-slot interchanger which can handle more time slots than present systems and which can utilize automatic controls.

Still a further object of the invention is to obviate the above-noted and other disadvantages of the prior art.

In one aspect of the invention, an improved photonic time-slot interchanger with fiber-loop delay lines receives at input of the interchanger N frames of data in preassigned time slots and the interchanger has a 1×N switch to switch each time slot from the input to one of the N fiber-loops of the delay-line memory. Each fiber-loop has a 2×2 switch to control the entry, circulatory storage and exit of data. The interchanger has a control means to direct the reconfiguration of time slots as the exit the memory through an N×1 switch to its output.

In a second aspect of the invention the 1×N and N×1 switches which are used to write data into the fiber-loops and read data from the fiber-loops are replaced with sets of interconnected 1×2 and 2×1, respectively, cascade-structured integrated optical switches having at least two cascaded stages and extinction ratios expressed in dB at least twice as good as prior art switches.

In a third aspect of the invention the cascade-structured 1×2 and 2×1 switches are bidirectional cascade-structured 1×2/2×1 integrated optical switches.

DESCRIPTION OF THE PREFERRED EMBODIMENTS

FIG. 1 is a block diagram to illustrate the general structure and function of a photonic time-slot interchanger. In the general embodiment illustrated in FIG. 1, a frame 10 of N (N=five in FIG. 1) time slots a-e, each slot containing data, is received from a multiplexer. Photonic data are switched into (written into) by a 1×N optical switch 11 an optical memory 12 having N storage locations. The photonic data are read out of storage rearranged into different time slots, that is, the time slots are interchanged, by an N×1 optical switch 13 resulting in a frame 14 with the time-slots reordered. A timing generator 15 provides the timing for the interchanger. Switch controllers 16, 17 know the reconfiguration assignment and control the operation of the write-in and read-out switches 11, 13 respectively. A memory reset circuit 18 completes the system.

This invention pertains to improvements for the photonic time-slot interchanger systems as described by Thompson and illustrated in FIGS. 2 and 3. Specifically, the present invention replaces conventional integrated optical directional coupler switches with cascade-structured integrated optical switches in the fiber-loop memories 22, 32 and/or in the read/write switches 21, 23 of those systems to improve the signal-to-crosstalk performance of said systems.

Figure 4:
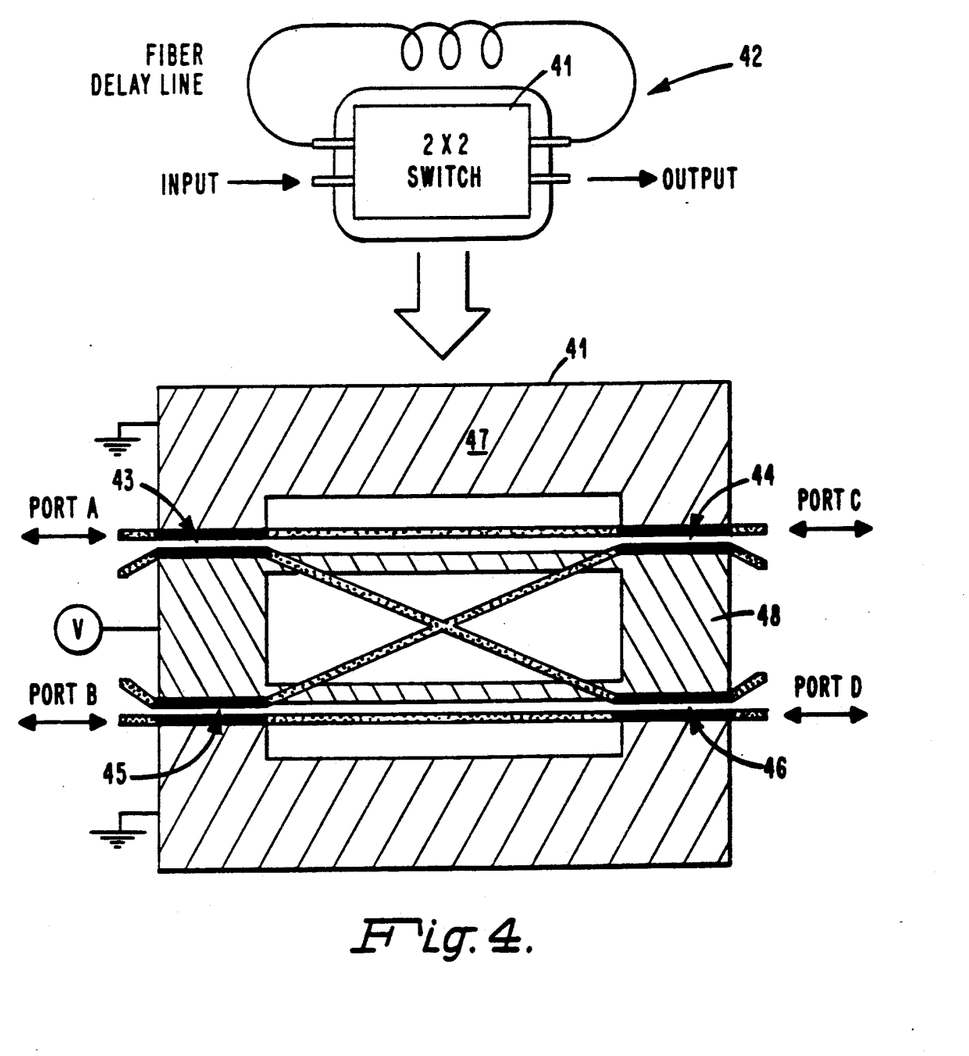
FIG. 4 is a schematic diagram of an optical reentrant-loop memory using a two-stage cascade-structured integrated optical 2×2 switch.

FIG. 4 illustrates the use of a 2×2 cascade-structured integrated optical switch 41 in a fiber-loop delay line memory 42 of the type shown in FIG. 2. Switch 41 has been disclosed in my copending U.S. patent application Ser. No. 07/422,252, filed Oct. 16, 1989, which is incorporated herein by reference. Integrated optical switch 41 is made by integrating four directional couplers 43-46 with a common set of uniform delta-beta electrodes 47, 48. The optical signals entering switch 41 pass through two stages of directional couplers, which are controlled by a single voltage or a single set of voltages. As disclosed in the cross-referenced application the cascade-structured 2×2 integrated optical switch 41 has a very high extinction ratio. Hence, the use of switch 41 to replace some or all of the conventional directional coupler switches 29 in the fiber-loop memory 22 of FIG. 2 results in a significant reduction of the crosstalk or the non-addressed spurious light.

Similar improvements in the reduction of crosstalk can be obtained by using the 2×2 cascade-structured integrated optical switch in the fiber-loop delay-line memories of the second and third embodiments of Thompson, namely the extra-loop design and the minimal-transversal design, as shown in FIGS. 2 and 3.

Figure 5:
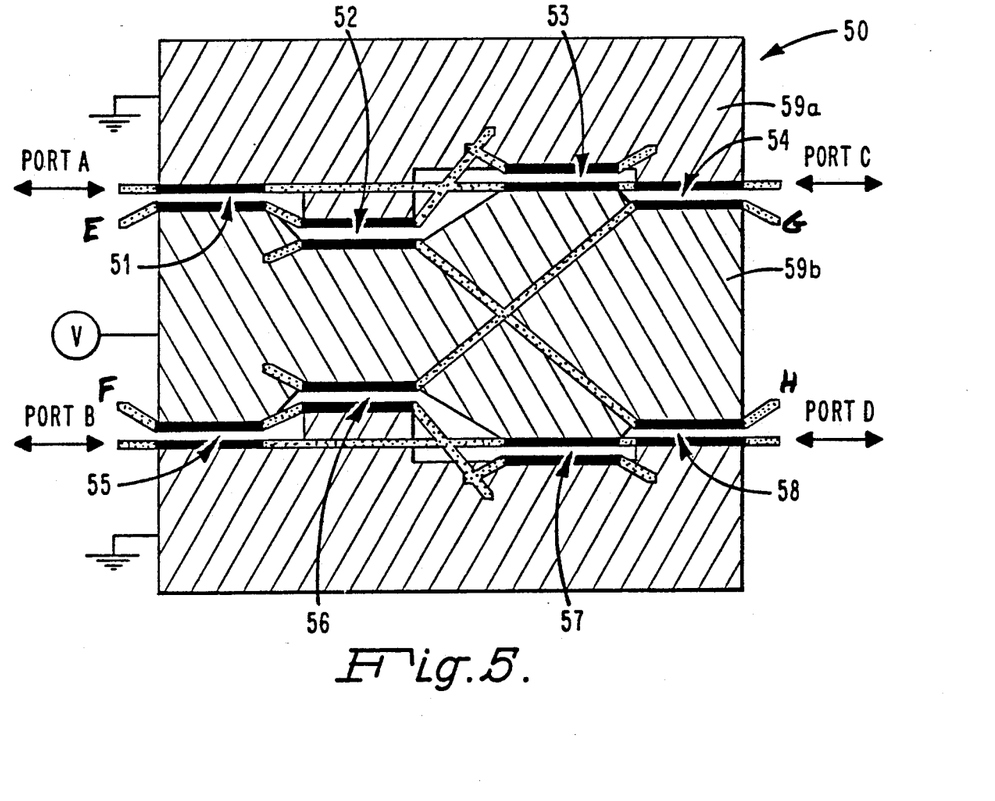
FIG. 5 is a schematic diagram of a three-stage cascade-structured integrated optical 2×2 switch.

The number of stages k in cascade-structured switches can be varied according to the requirements of a specific application for their use. For example, FIG. 5 is a schematic top view of a cascade-structured 2×2 switch 50 with k=3. In switch 50 eight directional couplers 51-58 are integrated with a common set of uniform delta-beta electrodes 59a, 59b. An optical signal inputted on any one of four ports A-D must pass through three directional couplers to reach a designated output. While not specifically disclosed and illustrated therein, switch 50 is within the scope of my earlier cross-referenced application.

Figure 6:
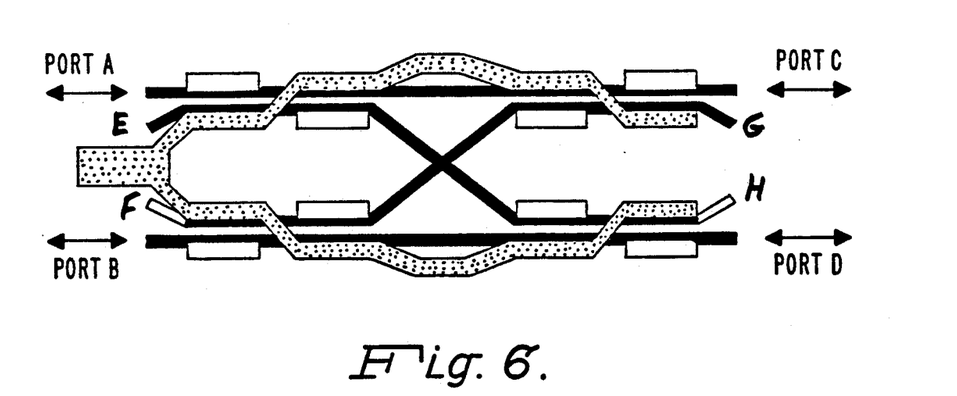
FIG. 6 is a schematic diagram of a two-stage cascade-structured integrated optical 2×2 switch using reverse delta-beta couplers.

It is possible, and sometimes beneficial, to use reverse delta-beta electrode designs for directional coupler switches. FIG. 6 illustrates the schematic top view of a cascade-structured integrated optical 2×2 switch with k=2, using directional couplers with the reverse delta-beta electrode design.

The optical switches 21, 23 that perform the write-/read operations in the photonic time-slot interchanger 20 of FIG. 2, and the variations discussed above are 1×2 switches. While a 2×2 integrated optical switch may be used as a 1×2 switch, it is advantageous to use a cascade-structured 1×2 integrated switch because with such a switch it is possible to avoid the waveguide intersection shown in FIGS. 5 and 6.

Figure 7:
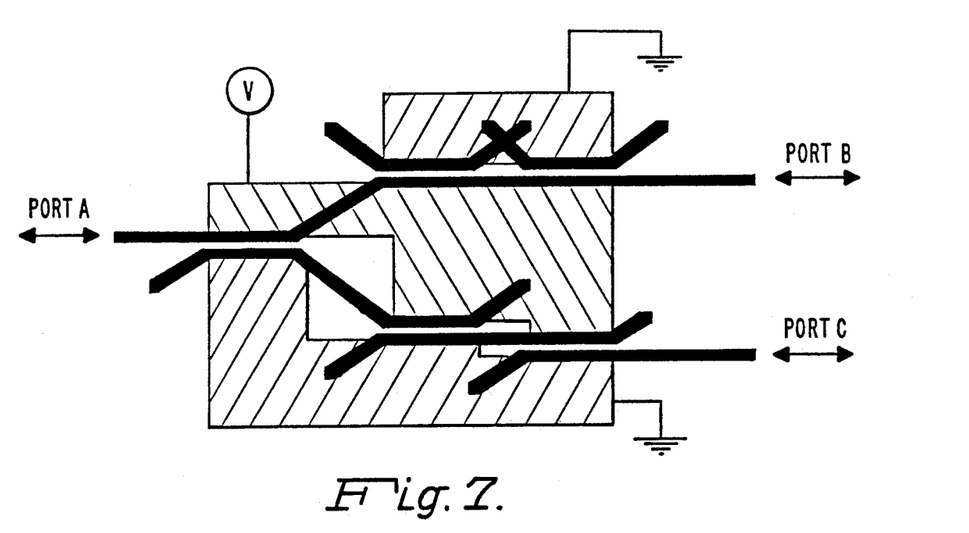
FIG. 7 is a schematic diagram of a three stage cascade-structured integrated optical 1×2 switch with uniform delta-beta electrode design.

FIG. 7 is a schematic top view of a cascade-structured integrated optical 1×2 switch with k=3 and with a uniform delta-beta electrode design. This switch is disclosed in my copending U.S. patent application Ser. No. 07/422,271, filed Oct. 16, 1989, which is incorporated herein by reference.

Figure 8:
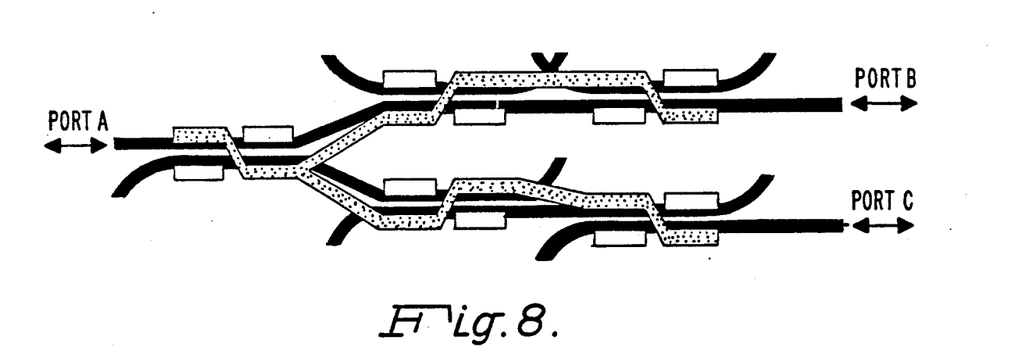
FIG. 8 is a schematic diagram of a three-stage cascade-structured integrated optical 1×2 switch with reverse delta-beta electrode design.
Figure 9A:
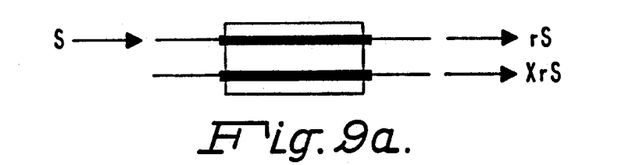
FIGS. 9a and 9b are diagram illustrating the power of input/output signals and crosstalk of 1×2 and 2×2 optical switches.
Figure 9B:
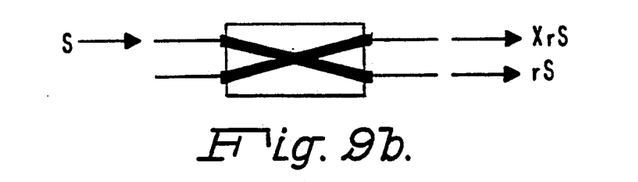

FIG. 8 is a schematic of the switch of FIG. 7, but with a reverse delta-beta electrode design. The 1×2 switches of FIGS. 7 and 8 have less loss and less crosstalk than the comparable 2×2 switches and far less loss and crosstalk than conventional 1×2 optical switches.

It is important to note that in the photonic time-slot interchanger systems based on FIG. 2, that optical signal amplification or regeneration may be required for meeting the optical power budget requirement. For the present invention, optical amplifiers or regenerators can be incorporated into each of the optical signal paths for that purpose.

Figure 10A:
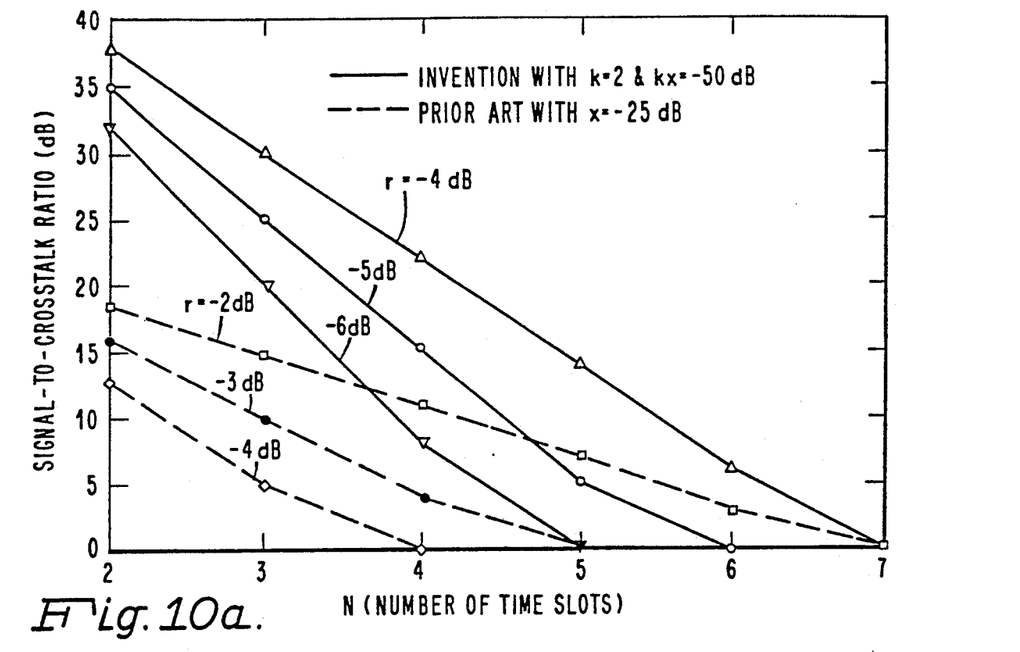
FIGS. 10a, 10b and 10c are graphs comparing the SXR performance, under a first set of conditions, of a time-slot interchanger according to the invention and time-slot interchangers according to three prior art designs.
Figure 10B:
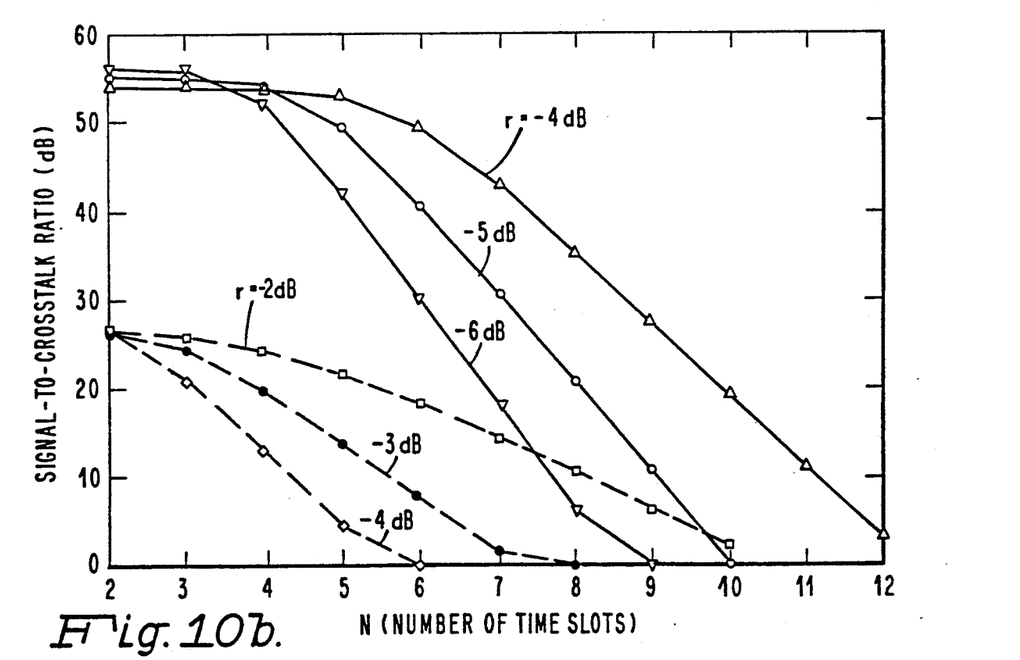
Figure 10C:
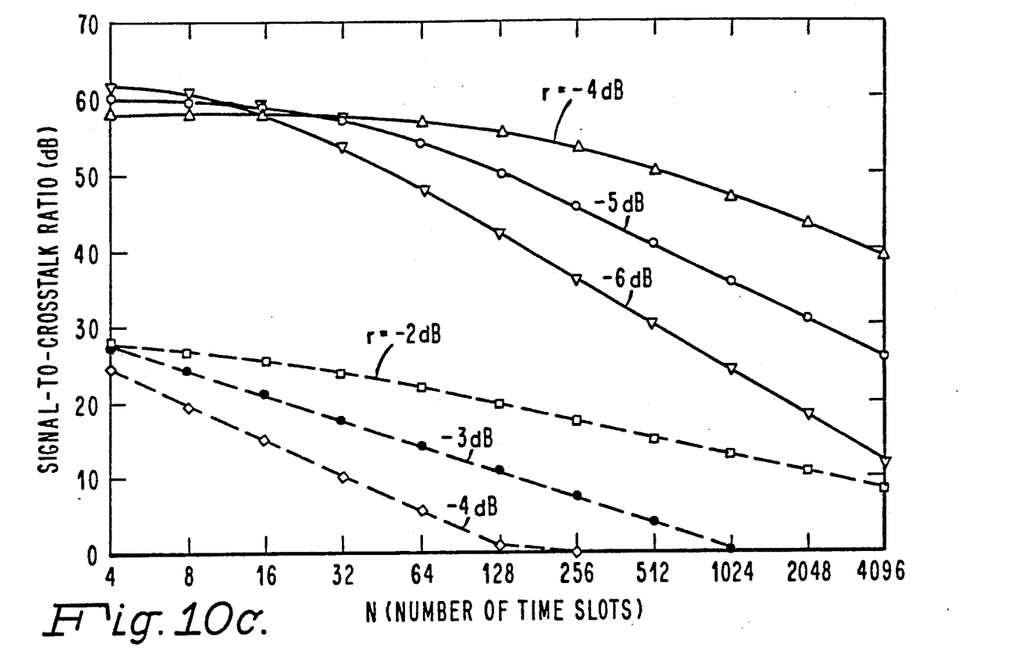

The SXR performances of time-slot interchangers incorporating cascade-structured integrated optical switches has been calculated and compared with the embodiments of the prior art time-slot interchangers based on FIG. 2, using the method developed by Thompson. In the calculations, the attenuation and the crosstalk of a 1×2 or a 2×2 optical switch are denoted r and X (or $X_s$), respectively, as shown in FIG. 10. The results are shown in FIGS. 10a, 10b, 10c and FIGS. 11a, 11b, 11c for the reentrant-loop, the extra-loop and the minimal-transversal designs respectively, under different conditions.

In FIGS. 10a, 10b and 10c it is assumed that the conventional directional coupler switches used in the prior art have an average crosstalk of −25 dB. Three attenuation levels are considered, r = −2, −3 and −4 dB, for each directional coupler switch. It is also assumed that cascade-structured switches with k=2 are used in the present invention, with the crosstalk reduced to kX = −50 dB in average. For the cascade-structured switches, a power penalty (i.e. increased optical power loss) is expected because of the multistage design. A power penalty of 2 dB is assumed for the calculations, resulting in r= −4, −5 and −6 dB, for the cascade-structured switches. As shown, the SXR performances of time-slot interchangers using this invention are in general better or much better than those of the prior art. For the reentrant-loop and extra-loop designs with specific SXR requirements, the maximum number of time-slots supported by the new designs is about twice as large as that of the prior art. For the minimal-transversal design, the SXR using the present invention is so much better than the prior art, that the maximum number of time slots supported is many times larger than the number supported in the designs of the prior art.

Figure 11A:
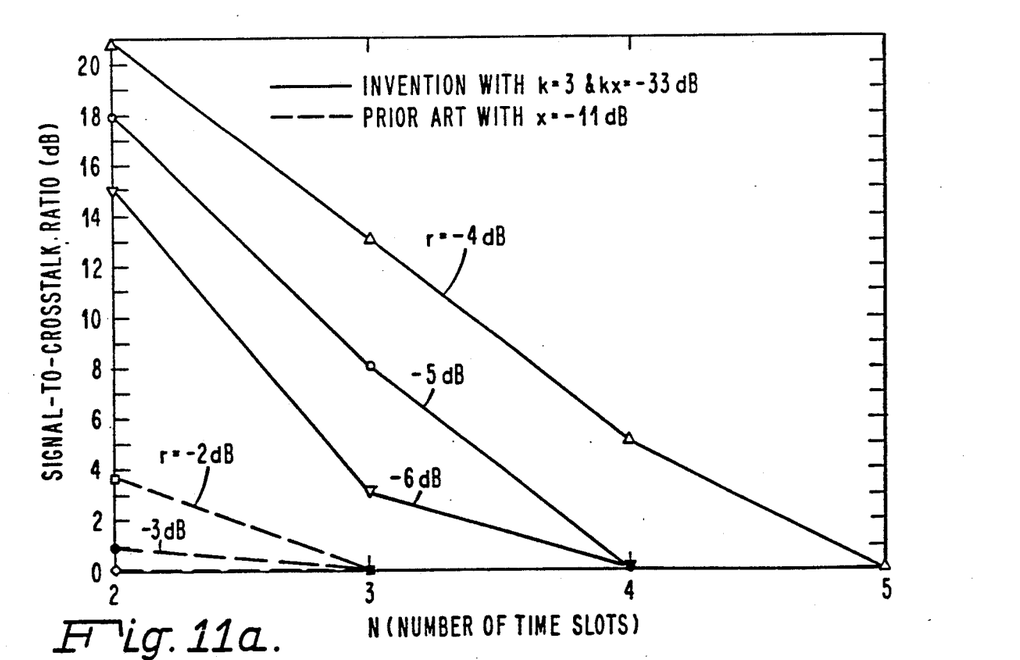
FIGS. 11a, 11b and 11c are graphs comparing the SXR performance, under a second set of conditions, of a time-slot interchanger according to the invention and time-slot interchangers according to three prior art designs.
Figure 11B:
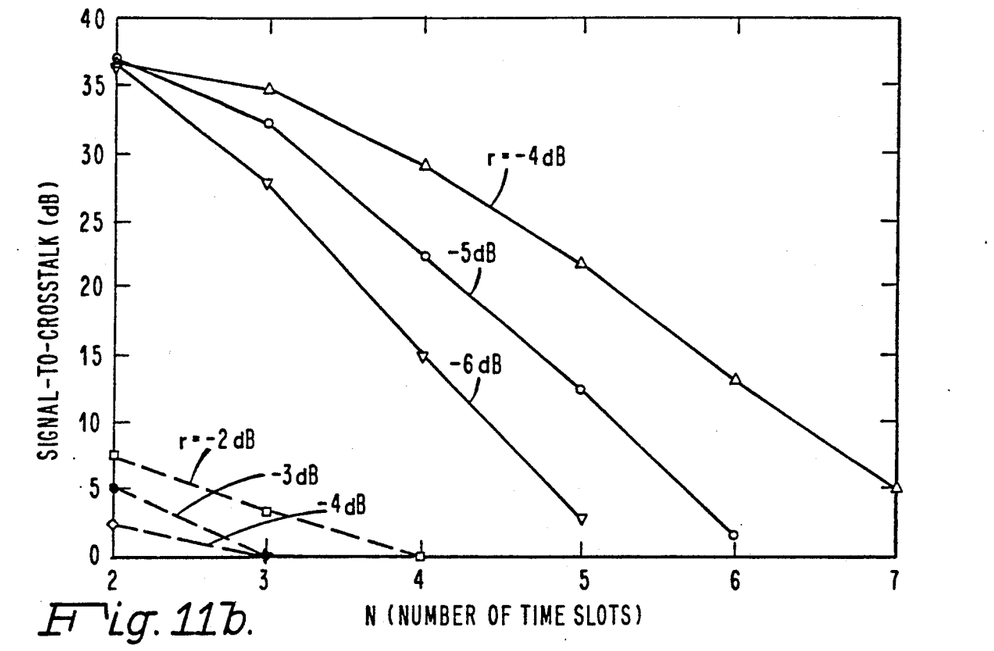
Figure 11C:
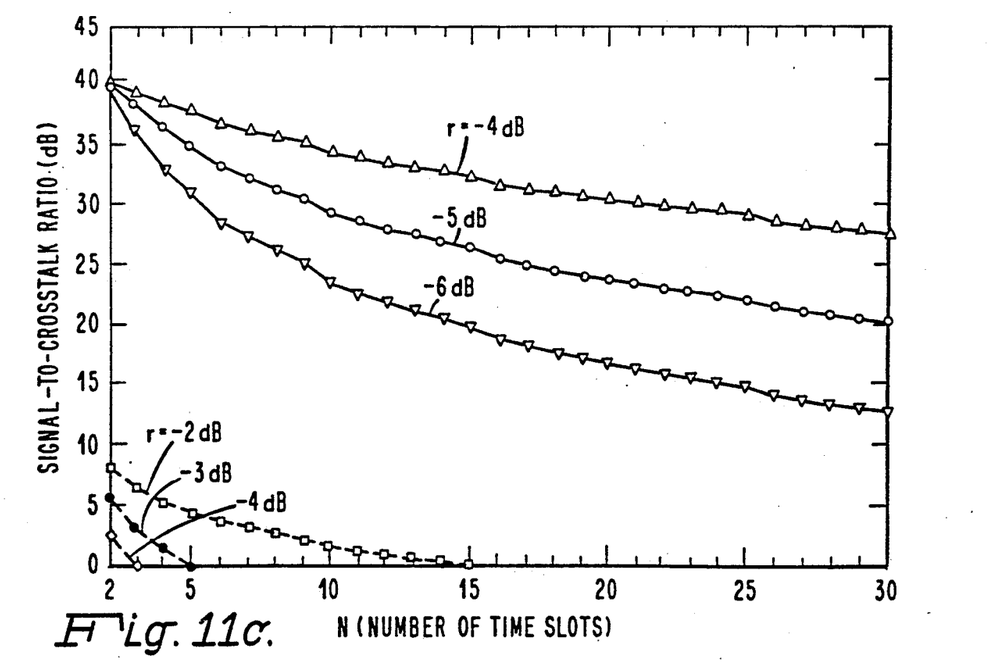

In FIGS. 11a, 11b and 11c, it is assumed that the conventional directional coupler switches used in the prior art have a quite high average crosstalk of −11 dB, considering the device nonuniformity and instability problems. Again, three attenuation levels are considered. r= −2, −3 and −4 dB, for each directional coupler switch, and a power penalty of 2 dB is assumed for the cascade-structured switches. Using cascade-structured switches with k=3 in the present invention, the crosstalk can be reduced to kX= −33 dB on average and the SXR performances are still better or much better that the prior art. As shown, it is quite difficult to implement photonic time-slot interchangers with good SXR by using switches with X= −11 dB. However, by using cascade-structured switches, photonic time-slot interchangers with reasonable numbers of time slots are possible with good SXR performance. For the minimal-transversal design, the maximum number of time slots supported by the designs of this invention is greater than thirty for an SXR>20 dB, considering r=5 dB and kX= −33 dB.

Cascade-structured integrated optical switches with various k stages (k=2, 3, . . . ) can be implemented by using different types of integrated optical switch components such as directional coupler switches and cross switches.

The integrated optical switches used in the invention can be electrooptic switches, acoustooptic switches or nonlinear optical switches.

Due to the optical loss and the limited extinction ratio of conventional integrated optical switches, the number of time slots supported by the photonic time-slot interchangers designed by Thompson has been quite limited. In this invention three systems have been redesigned by using cascade-structured integrated optical switches in the read/write optical switches and in the fiber-loop delay-line memories. The signal-to-crosstalk ratio of the new design is significantly better than the prior art, and the number of time slots supported by these new systems is significantly increased. The cascade-structured integrated optical switches have better tolerance to fabrication nonuniformity and drifting problems than the conventional integrated optical switches. The use of automatic control for the photonic time-slot interchangers is more feasible for the designs of this invention.

I claim:

1. An improved photonic time-slot interchanger with fiber-loop delay-lines, comprising:
   control means to control the operation of said time-slot interchanger and the reconfiguration of time-slots at its output;
   input means to receive frames of data in preassigned time slots into said time-slot interchanger;
   memory means comprising a plurality of fiber-loop delay lines;
   first switching means to switch each time slot of data to a fiber-loop delay-line under the control of said control means;
   second switching means in each fiber-loop delay-line to control the entry, circulation and exit of data of a time slot for said fiber-loop delay-line;
   output means to receive said interchanged time slots from said memory means; and
   third switching means to switch data from said memory means to said output means with the order of said time slots reconfigured under the control of said control means;
   wherein the improvement comprises:
   said second switching means is a plurality of interconnected multistage 2×2 cascade-structured integrated optical switches, thereby providing a very high extension ratio for said switching means.

2. The improved photonic time-slot interchanger of claim 1, wherein the improvement further comprises:
   said first switching means is a plurality of N interconnected multistage cascade-structured integrated optical 1×2 switches, thereby providing a 1×N switch with a very high extinction ratio.

3. The improved photonic time-slot interchanger of claim 1, wherein the improvement further comprises:
   said third switching means is a plurality of N interconnected multistage cascade-structured integrated optical 2×1 switches thereby providing a N×1 switch with a very high extinction ratio.

4. The improved photonic time-slot interchanger of claim 1, wherein the improvement further comprises:
   said first and third switching means are a plurality of N bidirectional interconnected multistage cascade-structured integrated optical 1×2/2×1 switches thereby providing 1×N and N×1 switches with a very high extinction ratio.

* * * * *